UNITED STATES PATENT OFFICE 1,964,815

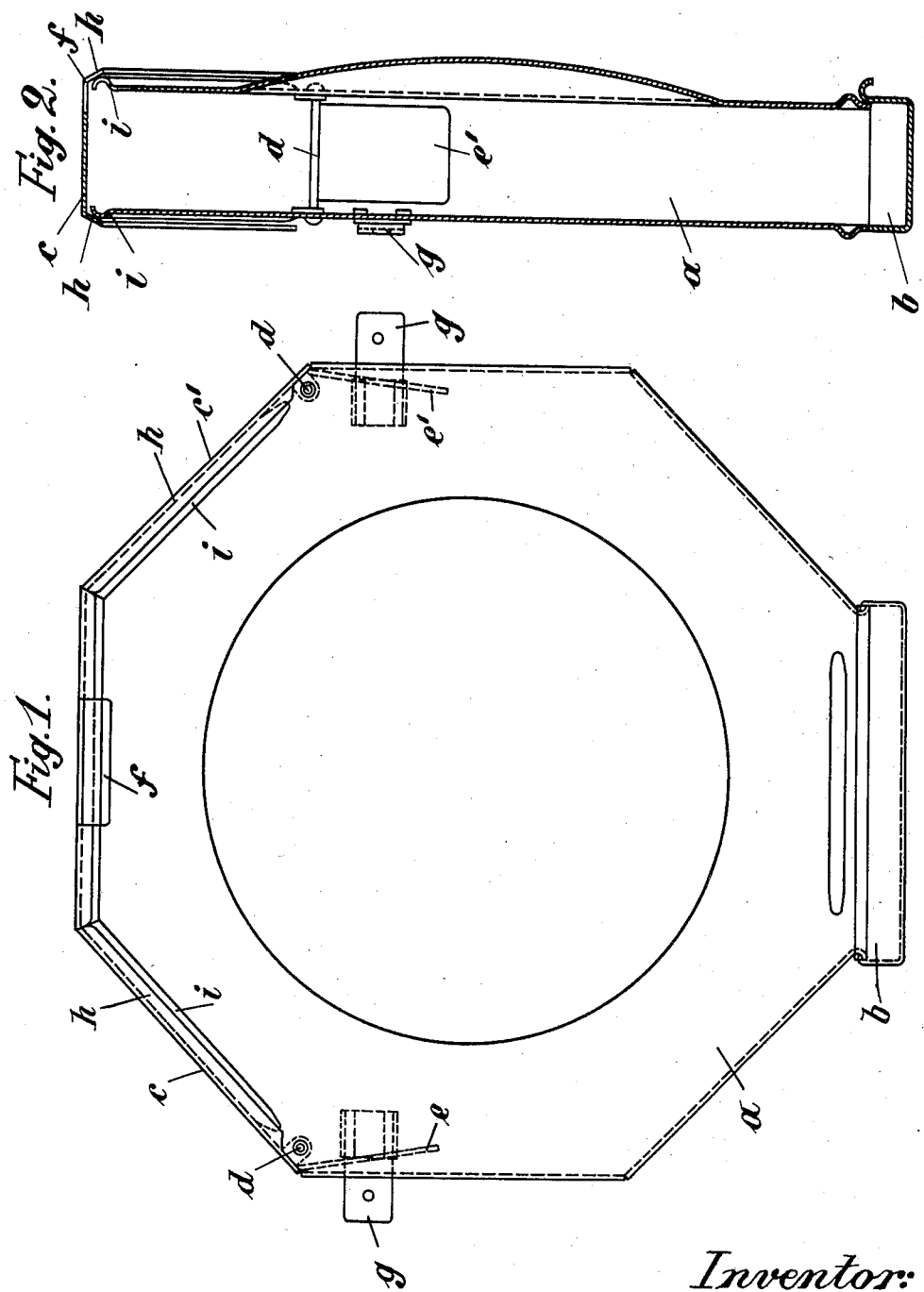

CONTAINER FOR STORING FRYING PANS

Richard Goedecke, Wernigerode, Germany

Application August 18, 1931, Serial No. 557,842
In Germany August 18, 1930

1 Claim. (Cl. 220—32)

This invention relates to a container for storing sooty and greasy frying pans coming from the stove. The container consists of a pocket covered at the top by two covers oscillatable on pins and having on the lower end tongue-like extensions projecting over the pivot pins so that, when the container is open, they project inwards into same, and the pan to be inserted in the container comes into contact therewith so that an automatic closing of the covers, after inserting the pan, is obtained. The new container is dust-tightly closed, when the frying pan is inserted so that the frying pan can neither be soiled by insects nor the walls, cupboards, shelves or the like can be soiled by the frying pans. The grease in the pan can drip into a box, when the frying pan stands vertically in the container, this box being removably fixed on the container.

A container for accommodating frying pans is illustrated by way of example in the accompanying drawing in which:

Fig. 1 shows the container in front elevation.
Fig. 2 is a longitudinal section of Fig. 1.

The container consists of a flat circular, octagonal or other suitably shaped pocket $a$, which is provided at the lower end with a slidable box $b$ for catching the grease dripping out of the pan. The upper open portion of the container $a$ is closed by a two-part cover $c$, $c'$, the parts of which are oscillatable on pins $d$, and which moreover have downwardly bent tongues $e$, $e'$. Each closing cover $c$, $c'$ is provided with an aperture $f$ through which the handle of the corresponding frying pan extends. The fastening of the pan pocket $a$ on the wall is effected by means of two lugs $g$ at a height within easy reach.

When the container is employed for the first time, the two covers $c$, $c'$ are opened by hand, after which the pan, as it comes from the stove greasy and sooty, is placed in the container from the top. The frying pan comes into contact with the tongues $e$ and $e'$ arranged on the cover halves so that the cover halves are closed automatically and the frying pan is enclosed substantially dust free by the inclined bent edges $h$ of the lid halves, which engage over heads $i$ on the front and rear wall (Fig. 2).

Housewives are in the habit of not cleaning the sooty and greasy frying pan coming from the stove, but of putting it to one side until again required so that walls, cupboards and shelves are often soiled. Such a soiling cannot occur with the new container and the housewife cannot soil herself, when putting down the frying pan or frying pans, any desired number of which may be accommodated at the same time in one pan pocket, as the opening and closing of the covers $c$ and $c'$ takes place automatically or is effected by the pans, so that the housewife has no extra work as compared with the manner of using the pan hitherto customary, but has the great advantage that the kitchen furniture is protected against being soiled by greasy and sooty frying pans, that the pans are accommodated in a completely closed container, which renders them inaccessible to insects and dirt, and that finally the grease dripping off the pans is caught in a box so that it can be again used.

I claim:

A container for storing frying pans, comprising in combination a pocket composed of a front wall having a cut out portion at its upper end, of a rear wall, and of a connecting wall between said front and rear walls and extending along both sides and at the bottom end of said front and rear walls forming a mouth at the upper end thereof, two pivot pins in said front and rear walls one adjacent each end of said connecting wall, two cover parts mounted at one end one on each of said pivot pins and having each a cut out portion, the cut out portions in said front wall and said two cover parts forming a slot for the passage of the frying pan handle when in the container, and flaps extending from the pivoted end of each of said cover parts into said pocket and partly covering the mouth thereof adapted to automatically swing said cover parts inwards and close said mouth of said pocket during the insertion of the frying pan.

RICHARD GOEDECKE.